United States Patent [19]
Schneier et al.

[11] Patent Number: 5,978,475
[45] Date of Patent: Nov. 2, 1999

[54] EVENT AUDITING SYSTEM

[75] Inventors: Bruce Schneier, Minneapolis, Minn.; John M. Kelsey, Jefferson City, Mo.

[73] Assignee: Counterpane Internet Security, Inc., Minneapolis, Minn.

[21] Appl. No.: 08/896,785

[22] Filed: Jul. 18, 1997

[51] Int. Cl.[6] .................................................. H04L 9/00
[52] U.S. Cl. ..................... 380/4; 380/3; 380/23
[58] Field of Search .................... 395/187.01, 183.21, 395/184.01, 185.01–185.09, 186, 188.01, 200.3, 280; 380/3, 4, 23, 20; 711/164; 364/184–186

[56] References Cited

U.S. PATENT DOCUMENTS

| | | | |
|---|---|---|---|
| Re. 34,954 | 5/1995 | Haber et al. | 380/49 |
| 4,672,572 | 6/1987 | Alsberg | 364/900 |
| 5,032,979 | 7/1991 | Hecht et al. | 364/200 |
| 5,136,646 | 8/1992 | Haber et al. | 380/49 |
| 5,155,693 | 10/1992 | Altmayer et al. | 364/550 |
| 5,428,795 | 6/1995 | Johnson et al. | 395/725 |
| 5,557,742 | 9/1996 | Smaha et al. | 395/186 |
| 5,675,510 | 10/1997 | Coffey et al. | 364/940.1 |
| 5,696,702 | 12/1997 | Skinner et al. | 364/551.01 |
| 5,826,021 | 10/1998 | Mastors et al. | 395/200.33 |
| 5,828,882 | 10/1998 | Hinckley | 395/680 |

*Primary Examiner*—Tod R. Swann
*Assistant Examiner*—Paul E. Callahan
*Attorney, Agent, or Firm*—Skadden, Arps, et al.; Joseph Yang

[57] ABSTRACT

In many computer applications, sensitive information must be kept on an untrusted machine. Such information must be protected against attackers, as well as against partially trusted entities to be given partial, but not total, access to the stored information. This invention provides a method, apparatus and computer-readable data structure for inhibiting an attacker from accessing or corrupting information stored by an untrusted machine. More specifically, in a log file generated during a process in which the untrusted machine is in limited communication with a trusted machine, entries generated prior to the attack remain secure (they cannot be modified without detection), even though subsequent entries can not be trusted. One embodiment of the invention also allows a partially trusted verifier to read and verify entries in the log file, but not to change them without detection. In another embodiment of the invention, operating with or without the trusted machine, the untrusted machine's log file can also incorporate log files of other processes.

70 Claims, 9 Drawing Sheets

EVENT AUDITING SYSTEM

BACKGROUND OF THE INVENTION

Audit logs have long been used to keep permanent records of critical events. The basic idea is that the audit log can be used at some future date to reconstruct events that happened in the past. This reconstruction might be required for legal purposes (to determine who did what when), for accounting purposes, or to reconstruct things after a disaster: errors, loss of data, deliberate sabotage, etc.

Traditionally, audit logs have been kept on paper. For example: 1) Account holders in banks were given bank books that log entries of every transaction in the account: deposits, withdrawals, and interest accrual; 2) Many cash registers print a record of every transaction on a paper tape inside the machine; 3) Notary publics in some jurisdictions keep a paper log listing all documents they have notarized; and 4) Many companies have logbooks where visitors sign their names upon entry into the premises.

Audit logs are more useful if the entries can be authenticated in some way. That is, there should be no way for a person to undetectably modify the audit log after the fact. There should be no way for a person to add backdated entries into the log, delete entries from the log, or modify entries already in the log. In the paper systems listed above, the physical log itself (either a single piece of paper or a bound book) enforces this authentication. If every cash register transaction is printed, one after the other, on a long spool of paper tape, someone cannot modify the log entries for past transactions. If a company's visitors log consists of a single bound book with sequential entries, someone cannot add or delete a name without being noticed.

Many modern audit logs are often kept in digital files on computer. Examples of such computer audit logs include but are not limited to: 1) a computer logging network access and other activity; 2) a door entry system that logs the entry/exit of people into/from a secure area; 3) a secure digital camera that needs to guarantee the authenticity of pictures it has taken; and 4) an electronic wallet (e.g., a smart card, a portable network computer, a PC dongle, or even a digital file). Such computer audit logs differ from paper documents in that they can be modified undetectably. For example, it is easy to read a computer file containing an audit log from a disk, add, delete, and modify individual entries at will, and write that file back to disk in such a way that the changes will go undetected. Computer files often contain information about when they were last modified, but this information is not secure and can be easily falsified. In fact, many computer hackers who break into computer systems take specific actions to modify the computers' audit logs to erase all traces of their actions.

Computer security manufacturers have responded to this threat in several ways. One is to force the audit log to be continuously printed out on paper. This is a common technique, described in Clifford Stoll's book "The Cuckoo's Egg." Variants of this technique involve writing the audit log to a non-erasable medium, such as a CD-ROM, or to a magnetic tape machine with no rewind capabilities. Sometimes the entire contents of a computer disk is saved to backup tape, and that tape is stored off-line for audit purposes.

Another approach uses conventional computer security techniques to guard the audit log files. Such techniques include hiding the log files, encrypting them, requiring special permissions to write to them, etc. These techniques work well in some applications—most notably when the audit log is stored on a shared computer and the malicious person trying to modify the audit log does not have full permissions on that computer—but are not without their problems. For example, clever hackers can often figure out ways around the computer security techniques and make changes to the audit log.

Another disadvantage of conventional techniques is that they do not work when the software creating the audit log does not trust the machine or network it is running on. This situation might occur when a Java-like Internet application is running on an unsecured remote machine or over an insecure network, when a software "agent" is running on a remote computer, or when a piece of software is running on a hardware device whose tamper-resistance features are not reliable.

One solution to the untrusted machine problem is disclosed in U.S. Pat. No. 5,136,646 for applications where a sequence of files is continuously being generated. The solution involves writing a hash of an immediately preceding file into each current file. In this way, each file is chained to a temporal sequence of all its predecessors, such that an attacker modifying any file must also modify all of its predecessors in the chain to avoid detection. This increases, but does not eliminate the likelihood of a successful attack. Furthermore, such an attack will destroy the security of every file in the chain, in addition to the particular file targeted for attack. Like most systems, the security ultimately rests on safeguarding one or more cryptographic keys (e.g., a message encryption/decryption key or an authentication key used in a keyed hash). This poses an especial problem when sensitive information must be kept on an untrusted machine ("U") that is not physically secure or sufficiently tamper-resistant to guarantee that it cannot be taken over by some attacker.

One solution to the untrusted machine problem is to maintain secure communication with a trusted machine ("T"). In particular, if there is a reliable, high-bandwidth channel constantly available between U and T, then the security of information on U is easily guaranteed. U need only encrypt the information as it is created and transmit it to T over the channel. The information is then stored in an audit log on T, in a secure form safe from attack.

A few moments' reflection will reveal that no security measure (including the channel to T) can protect audit log (also called a "logfile") entries written after an attacker has gained control of U. At that point, U will write to the log whatever the attacker wants it to write. This problem arises, for example, where a common encryption key is used for multiple information entries. However, it is possible is to refuse the attacker the ability to read, alter, or delete log entries made before he compromised the logging machine by using signed Diffie-Hellman key exchange and exchanging new keys every few minutes.

Thus, using Diffie-Hellman key exchange to communicate with a trusted machine over a reliable, high-bandwidth, continuously available channel is a preferred solution to situations where information must be kept on a unsecured machine. Unfortunately, such an ideal communications channel is often unavailable. In a system lacking such an ideal communications channel, we nevertheless would like to be able to:

1) ensure that an attacker who gains control of U at time t will not be able to read log entries made before time t;

2) ensure that the attacker will not be able to undetectably alter or delete log entries, made prior to time t, after U reports its results back to T; and 3) provide for occasional "commitments" from U, specifying the current values of its logs in a way that will not allow any later changes to be undetectably made, even if U is compromised.

SUMMARY OF THE INVENTION

The present invention provides a method and apparatus for generating a secure audit log using an untrusted machine communicating with a trusted machine over a limited communications channel. As in the prior art, entries are stored in the audit log in sequential order. Each entry in the audit log contains the one-way hash of the previous entry. This enables an auditor to verify that every entry was written into the log after the previous entry and before the subsequent entry. Any attempt to delete entries, add entries, or modify entries in the middle of the log will be immediately noticed because the one-way hash function values will no longer be valid.

In one embodiment of the invention, each log entry contains a permission mask, an encrypted file, a (unkeyed) hash value including the encrypted file plus a representation of a previous hash value, and a (keyed) message authentication code (MAC) value that itself authenticates the hash value. The MAC is cryptographically secured with a authentication key derived by hashing an authentication key for a previous log entry; and the encrypted file is cryptographically secured with an encryption key derived by hashing the authentication key. This makes it possible to give encryption keys for individual log entries to partially-trusted entities, allowing them to read and decrypt files without being able to make undetectable changes. In addition, the (unkeyed) hash value allows the partially trusted verifier to verify the decrypted files while security is maintained by the (keyed) MAC. In addition, because both the authentication and encryption keys are session-specific and irreversibly related to their predecessor values (i.e., a current key can be generated from its predecessor, but not vice-versa), an attack on a single entry can not be extended backward through the sequence to change the entire audit trail. This both prevents undetectable attack on a single entry and preserves the security of its predecessors.

Various enhancements to, or alternative embodiments of, the invention include: 1) adding log entries belonging to complementary processes, 2) replacing the trusted machine with a beacon, or 3) replacing the trusted machine with a network of untrusted peers. Where the trusted machine (or channel) is unavailable, security is less than when the trusted machine is available, but is nevertheless significantly enhanced over the prior art. The various embodiments of the invention are more fully described in the detailed description below.

DETAILED DESCRIPTION OF THE INVENTION

A. System Architecture

Figure 1A:
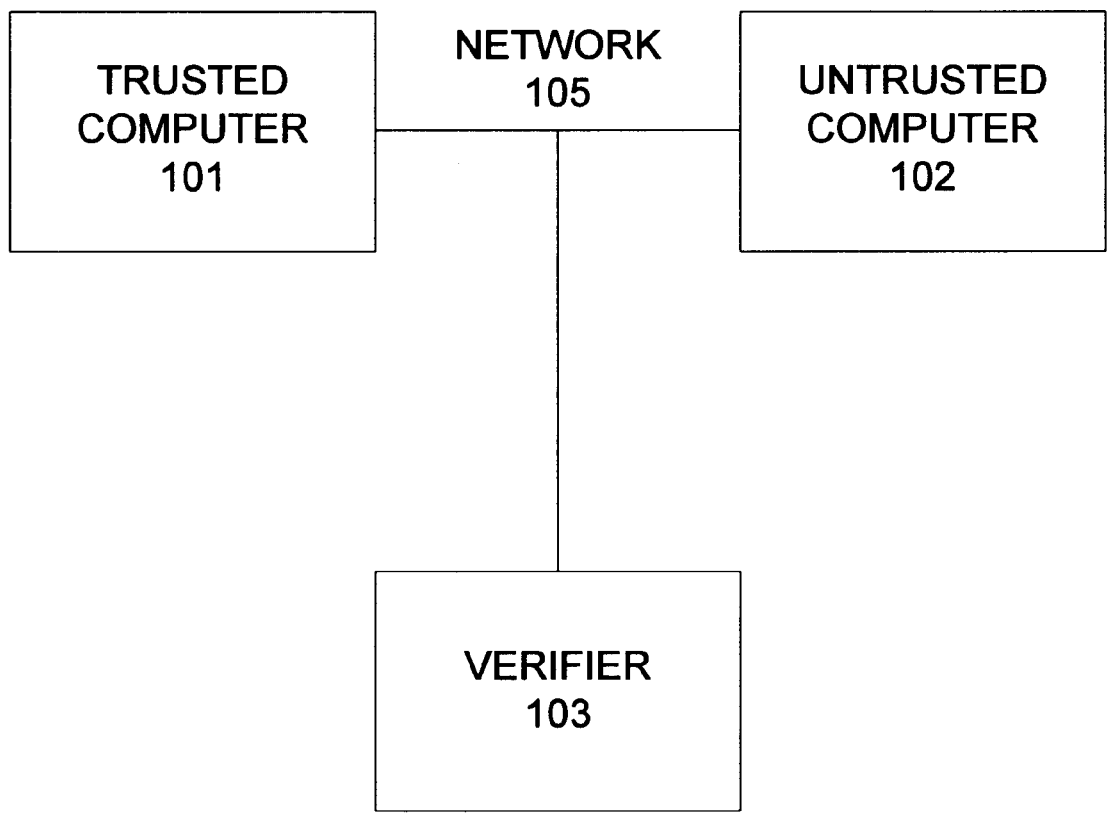
FIG. 1A illustrates trusted computer, an untrusted computer, and a partially trusted verifier communicating over a network.
Figure 1B:
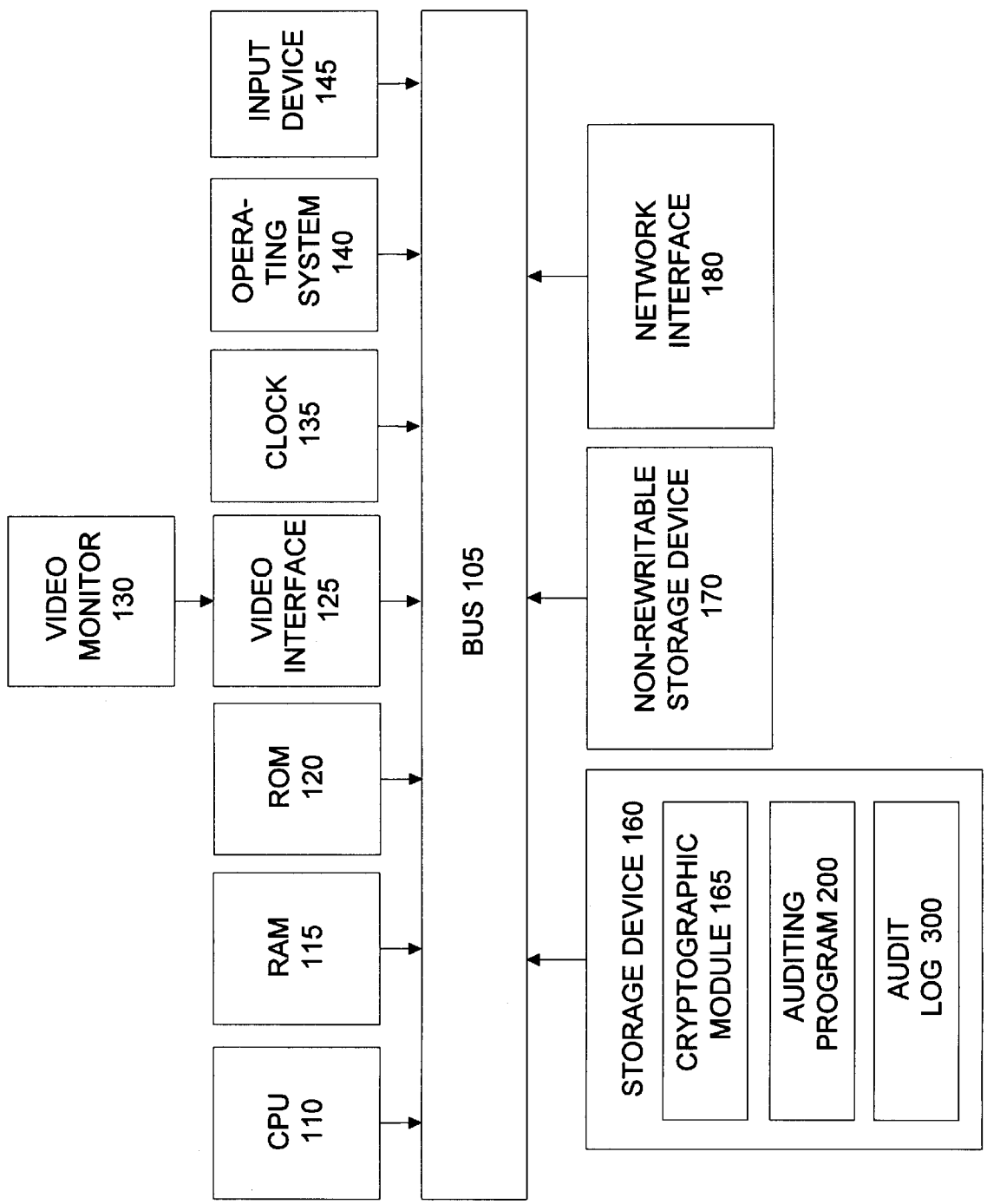
FIG. 1B illustrates an exemplary embodiment of the untrusted computer.

The system architecture of an exemplary embodiment of the present invention is illustrated schematically in FIGS. 1A and 1B. FIG. 1A illustrates a trusted computer (T) 101 in communication with an untrusted computer 102 over a communications network 105. Communications network 105 includes telephone lines, LANs, WANs, wireless networks, direct physical connections, and any other technology by which computers may communicate with one another. Untrusted computer 102 keeps an audit log (or logfile) whose security is guaranteed via communications with trusted computer 101 using the protocols of various embodiments of the invention, as will be described in detail later. The logfile may occasionally be provided to a third party verifier 103. FIG. 1B illustrates one embodiment of untrusted computer 102. Untrusted computer (U) 102 includes a central processing unit (CPU) 110, RAM 115, ROM 120, video interface 125 connected to video monitor 130, clock 135, operating system 140 (illustrated separately, but typically distributed among storage device 160, ROM 120, and RAM 115), input device 145 (e.g., keyboard, mouse, I/O port), storage device 160, and one or more external (e.g., network) interfaces 180. These components may be implemented in any conventional personal computer or workstation with sufficient memory and processing capability to perform the functionality described below. For example, a Pentium microprocessor such as the 100 MHz P54C, manufactured by Intel Corporation, may be used for CPU 110. Equivalent processors include the Motorola 120 MHz PowerPC 604, Sun Microsystems' 166 MHz UltraSPARC-I, the DEC Alpha, and many other processors as will be recognized by one skilled in the art.

Alternatively, computer 102 could be an embedded system running in an electronic device: for example: a digital camera, a computer lock on a safe, a computer-controlled physical access, a smart card, or an electronic wallet. In these cases it might not have a video monitor 135 or video interface 130, it might not have an operating system 140, or it might have the bus 105, CPU 110, RAM 115, ROM 120, and clock 135 on a single silicon chip. In some cases, a small LCD screen might take the place of a video monitor 135.

Storage device 160 can be system RAM (in which case it would be indistinguishable from RAM 115), a conventional magnetic hard drive, a magneto-optical drive, a recordable CD-ROM or DVD drive, a PC-MCIA memory card, a flash memory module, a floppy disk, a smart card, a tape cartridge, any other active or passive computer-readable medium from which information can be stored and accessed, or any combination of the above elements. Storage device 160 contains cryptographic module 165, audit logging program 200 (to be described below with respect to FIG. 2), and the audit log 300 (to be described below with respect to FIG. 3).

In one embodiment of the invention, the cryptographic module 165 is a software program running on the CPU 105 and stored on the storage device 160. In an alternate embodiment, the cryptographic module 165 might be a hardware co-processor connected directly to bus 105 or communicating with the system via external interface 180. An exemplary hardware co-processor is a PC-MCIA card interfacing with the computer using RSA Data Security's Public Key Cryptography Standards (PKCS) 11 (also known as Cryptoki) interface.

Cryptographic module 165 has the ability to perform a variety of functions required by the auditing program 200. Such functions include, but are not limited to: 1) a one-way hash function, such as SHA-1, MD5, or RIPE-MD 160; 2) a Message Authentication Code (MAC), such as CBC-MAC or HMAC; 3) a symmetric encryption algorithm, such as DES, triple-DES, IDEA, RC4, RC5, or Blowfish; and 4) a public-key encryption or digital signature algorithm, such as RSA or E1 Gamal, and 5) random number generation. Those skilled in the art will be familiar with these algorithms, which are described in well-known references (such as Bruce Schneier, "Applied Cryptography, 2nd Edition," John Wiley & Sons, 1996) containing extensive details on the mathematics and programming aspects of, and specific algorithms for, these and other algorithms used in cryptographic operations.

Although not shown in FIG. 1B, untrusted computer 102 can also take a generalized configuration in which the necessary functionality is distributed over a plurality of computers. In one such distributed architecture, the various processors (e.g., CPU 110 or cryptographic module 165) and storage devices (e.g., storage device 160) are housed in separate units or locations. Locations performing primary processing functions should contain at least memory and a general purpose processor, but other locations need only contain sufficient storage to act as software or data servers plus the associated processing capacity for serving the information. The various locations are interconnected via routers, gateways, and other networking devices. Such distributed computing arrangements are more dynamic and flexible, and thus less prone to catastrophic hardware failures affecting the entire system, than single-computer systems.

Finally trusted computer 101 may also have a single or distributed computer configuration similar to untrusted computer 102, except that it has stronger security provisions. For example, trusted computer 101 will typically have electrical, electronic, physical or other tamper-resistant protection for storage device 160 containing cryptographic module 165, auditing program 200, and audit log 300. Alternatively, one or more of these elements could be located in a separate non-rewritable storage device 170. Non-rewritable storage device 170 includes any medium characterized in that once a record is written thereto, the record cannot be altered or deleted without detection. These would include the physical logs (e.g., bound book, paper tape, etc.) described previously in the "Background of the Invention," as well as electronic, magnetic, or magneto-optical devices (e.g., WORM drives). Of course, if the cryptographic module is implemented as a hardware co-processor, it could similarly be protected by anti-tampering measures. In general, any or all of the elements of the computer system can be protected by anti-tampering measures. Such measures are well known to those skilled in the art and need not be discussed in detail here. In an exemplary 2-party embodiment, the untrusted computer might be a consumer's electronic wallet and the trusted computer might be an ATM machine or other bank entity. Alternatively, the trusted computer could physically reside in a trusted location.

Verifier (V) 103 is a computer to which a verifiable audit log is provided, and will typically be partially trusted. That is, it may (or may not) have any or all of the security measures discussed previously with respect to trusted computer 101. In an exemplary 3-party embodiment, the untrusted computer might be a consumer's electronic wallet, the trusted computer might be a secure central bank computer, and the verifier might be a publicly accessible (and thus less secure) ATM machine. Alternatively, the verifier might be a creditor. The invention is not limited to these particular examples of the parties' identities, but is generally applicable to any combination of parties' identities as will be understood to those skilled in the art.

B. Auditing Program

Figure 2:
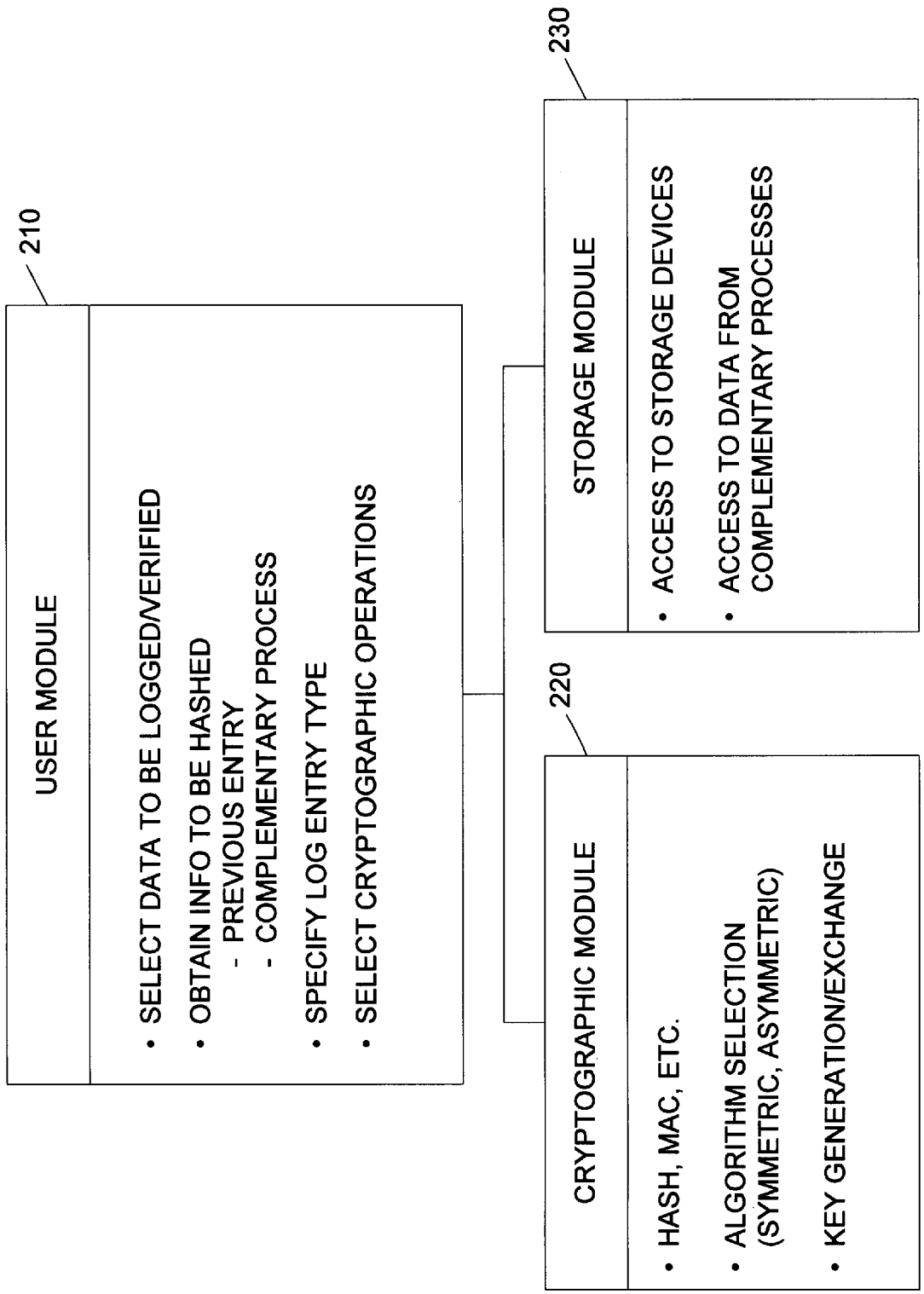
FIG. 2 illustrates a software embodiment of the auditing program.

FIG. 2 illustrates the key components of auditing program 200, including a user module 210, a cryptographic module 220, and a file storage module 240. User module 210 receives the user's selection of the information to be logged, what cryptographic options are to be used to protect it (these could be pre-specified defaults), and the output device and frequency; and communicates these selections to cryptography module 220 and file storage module 230 as appropriate.

If cryptographic module 165 of FIG. 1 is implemented as local software, cryptographic module 165 and cryptographic module 220 can be identical. But if cryptographic module 165 is implemented as remote software or as a hardware processor (e.g., a BBN SafeKeyper module) cryptographic module 220 can be an interface to cryptographic module 165.

File storage module 230 obtains (inputs) the selected information to be logged and data to be hashed from file storage device 160 or remotely via external interface 180, as appropriate. Files storage module 230 also provides (outputs) the logged event, or parts thereof, to the appropriate storage devices. In one embodiment of the invention, a primary storage device is file storage device 160 and a secondary storage device (if present) is secure storage device 170. The various cryptographic and file manipulation operations implemented by cryptographic module 220 and file storage module 230 will be described in more detail with respect to various embodiments of the invention below.

C. Audit Log

Figure 3:
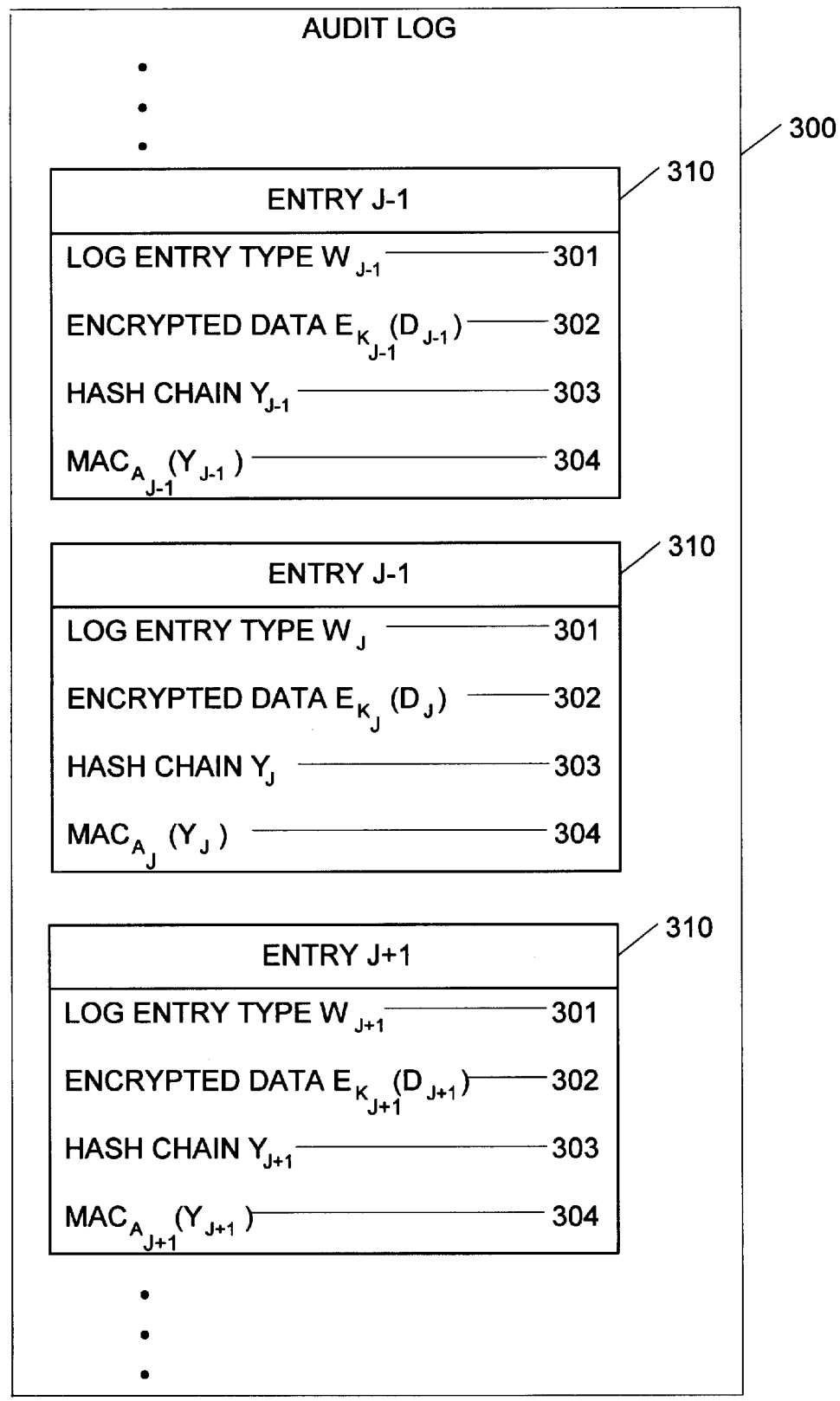
FIG. 3 illustrates one embodiment of the audit log.

FIG. 3 shows the data structure of an audit log 300 produced by auditing program 200. The audit log is a collection of sequential entries 310. Each entry 310 includes the permission mask 301 (described in more detail later—this may include the type of action that is being logged, the person or computer that initiated the action, the results or effects of the action, etc.), the encrypted data 302, a hash chain entry 303, and an authenticatable version of the hash chain entry 304.

In general, the logged event information 201 may be any information that can be represented in digital form. For any particular event, this will depend heavily on the application. For example, a typical computer security audit log might include successful and unsuccessful log-ons, log-offs, remote log-ins, and/or telnets, while an audit log for an electronic lock on a safe might include opening the door, closing the door, attempting a combination, and/or changing a combination. An audit log for a digital electronic-commerce device might include deposits, withdrawals, items purchased, balance inquiries, error conditions, bank reconciliations, etc. The logged information will also typically include the date/time the information was obtained or the entry was written.

The various elements of the log entry 310 will now be described in detail below, in the context of the method of operation of one embodiment of the invention.

D. Logging Operations

1. Overview

The method of the invention may involve the following phases:

Startup—An initial interaction with the trusted computer to allow the untrusted computer to create a new log file.

Writing—As events occur and are logged, new entries are added to the log file on the untrusted computer.

Posting—Occasionally during the course of the logging, the untrusted computer may write "summary records" into its logfile to allow independent chunks of the logfile to be independently verified and accessed independent of all the others.

Closing—A final set of operations to seal the logfile and transmit it to the trusted computer for verification.

Verification—The set of operations done on the logfile to guarantee that it hasn't been altered or had any records deleted by someone who didn't know the authentication key for that record.

Various aspects of these phases of the invention will be described in more detail below. But first, we discuss notation and tools. Next, we discuss the method of one embodiment of the invention (startup, writing, posting, closing & verification). Finally, we discuss some extensions and variations on the scheme.

2. Cryptographic Notation and Tools a. Notation

The following notation is used throughout this patent:

i. Machine Identification

T denotes a trusted machine.

U denotes a untrusted machine.

V denotes a partially-trusted verifier.

ii. Cryptography $ID_x$ represents a unique identifier string for an entity X.

$E_K(Y)$ is the symmetric encryption, under key K, of Y.

hash(Y) is the one-way hash of Y.

$MAC_K(Y)$ is the symmetric message authentication code, under key K, of Y. Thus, $MAC_K(Y)$ is an example of a cryptographically authenticatable representation of Y.

A,B represents the concatenation of A with B.

$PKE_{PKx}(Y)$ is the public-key encryption, under X's public key, of Y.

$SIGN_{SKx}(Y)$ is the digital signature, under X's private key, of Y.

iii. Log Entry Codes

During the startup and writing phases, log entry types (or codes) are written to the audit log, as will be discussed in greater detail, below. The type serves as a permissions mask for the verifier V by allowing trusted machine T to control which log entry types any particular V is allowed to access. Certain predetermined constants or other uniquely determined strings are therefore reserved to denote these log entry types. In one embodiment of the invention, these might be as follows:

Code 0xffffff000 (or, more generally, ErrorCode) is the null code. This code can be used only to signal an internal error.

Code 0xffffff001 (or, more generally, LogfileInitializationCode) is the code for the first record. This code may appear exactly once, for the first entry in a log. Its use will be described in greater detail below, with respect to startup.

Code 0xffffff002 (or, more generally, AbnormalCloseCode) is the code indicating an aborted startup. This code is valid only as the second and last record in a logfile. The corresponding record data is the current timestamp (time of aborting the startup) and/or a textual reason for the aborted startup. Use of this code and the corresponding record data will be described in greater detail below, with respect to startup.

Code 0xffffff003 (or, more generally, ResponseMessageCode) is the code indicating receipt and verification of a proper response message during startup, as will be described in greater detail below.

Code 0xffffff004 (or, more generally, PostingCode) is the code for a posting record. This code may appear any number of times throughout a logfile. The corresponding record data is a four-byte timestamp from U.

Code 0xffffff005 (or, more generally, NormalCloseCode) is the code for the final-record message. This code is valid only once in a logfile, and only as the last record in the logfile. Its corresponding record data is the current timestamp (time of closing the logfile) from U. As will be seen later, this record amounts to a promise by U that, if it hasn't been compromised, it has irretrievably deleted the last A value from memory, as well as all others.

Code 0xffffff006 (or, more generally, Cross-Authentication Send) is the code indicating transmission of a complementary process entry (e.g., to another untrusted machine).

Code 0xffffff007 (or, more generally, Cross-Authentication Receive) is the code indicating receipt of a proper complementary process entry (e.g., from another untrusted machine).

Code 0xffffff008 (or, more generally, Cross-Authentication Receive Error) is the code indicating a timestamp (or other) error in a received complementary process entry.

Code 0xffffff009 (or, more generally, Cross-Authentication Reply) is the code denoting proper receipt of a complementary process entry by the other machine.

Code 0xffffff0010 (or, more generally, Cross-Authentication Reply Error) is the code denoting a timeout (or other error) before receiving the complementary process entry by the other machine.

The particular codes in this embodiment are arbitrary, and could be different in different embodiments. Additional log entry codes may also be used, depending on the level of complexity needed for various embodiments of the invention.

b. Tools

The method of the operation uses various cryptographic techniques including symmetric (secret key) and asymmetric (public key) cryptography, secure key exchange, one-way hash functions (including keyed hash functions known as MACs), random number generation, and other techniques well known to those skilled in the art.

A symmetric cryptographic algorithm is one in which the encryption key is also the decryption key. Thus, it must be kept secret and is sometimes called a secret key. Examples of commonly used symmetric encryption algorithms include DES, triple-DES, IDEA, RC4, RC5, and Blowfish. Symmetric keys are generated and exchanged between entities using well-known key exchange protocols. A commonly used example is the Diffie-Hellman key exchange protocol.

An asymmetric cryptographic algorithm is one in which the encryption key and decryption key are distinct. Furthermore, one can be private (secret) and the other can be public (openly distributed). Commonly used examples of asymmetric algorithms include RSA, DSA and E1 Gamal. More precisely, when a public key is used as the encryption key, the operation is called public key encryption; and when a private key is used as the encryption key, the operation is called digitally signing. Thus, asymmetric cryptographic algorithms are sometimes generally called public key algorithms or digital signature algorithms.

A hash function is a mathematical function h=H(x), which accepts an arbitrary input x and generates a fixed-length, cryptographically verifiable output h. The function H(x) is specifically designed so that it is easy to calculate h given x, but infeasible to calculate x given h (this is the "one way" property of the function.) The function H(x) is also specifically designed to that it is infeasible to find two arbitrary values, x and x', such that H(x)=H(x') (this is the "collision free" property of the function). Examples of commonly used hash functions include RSA Data Security Inc.'s MD2, MD4 and MD5 (Message Digest 2, Message Digest 4, and Message Digest 5), the National Institute of Standards and Technology's federal standard SHA-1 (Secure Hash Algorithm, Revision 1), and the European standard RIPE-MD. Those skilled in the art will recognize that these and many other collision-free, one-way functions can be used for the purposes described herein. As a matter of convenience, all such functions will be referred to herein as hashes. Some hash functions require a cryptographic key and are known as keyed hashes or message authentication codes (MACs). A MAC is an example of a cryptographically authenticatable representation of the MAC'd data. Examples of commonly used MACs include CBC-MAC and HMAC.

Those skilled in the art will be familiar with these and many other well known cryptographic algorithms, which are described in well-known references such as Bruce Schneier's "Applied Cryptography, 2nd Edition," (John Wiley & Sons, 1996) containing extensive details on their mathematics and programming aspects and thus need not be discussed in detail here.

3. Method of Operation a. Startup

Figure 4:
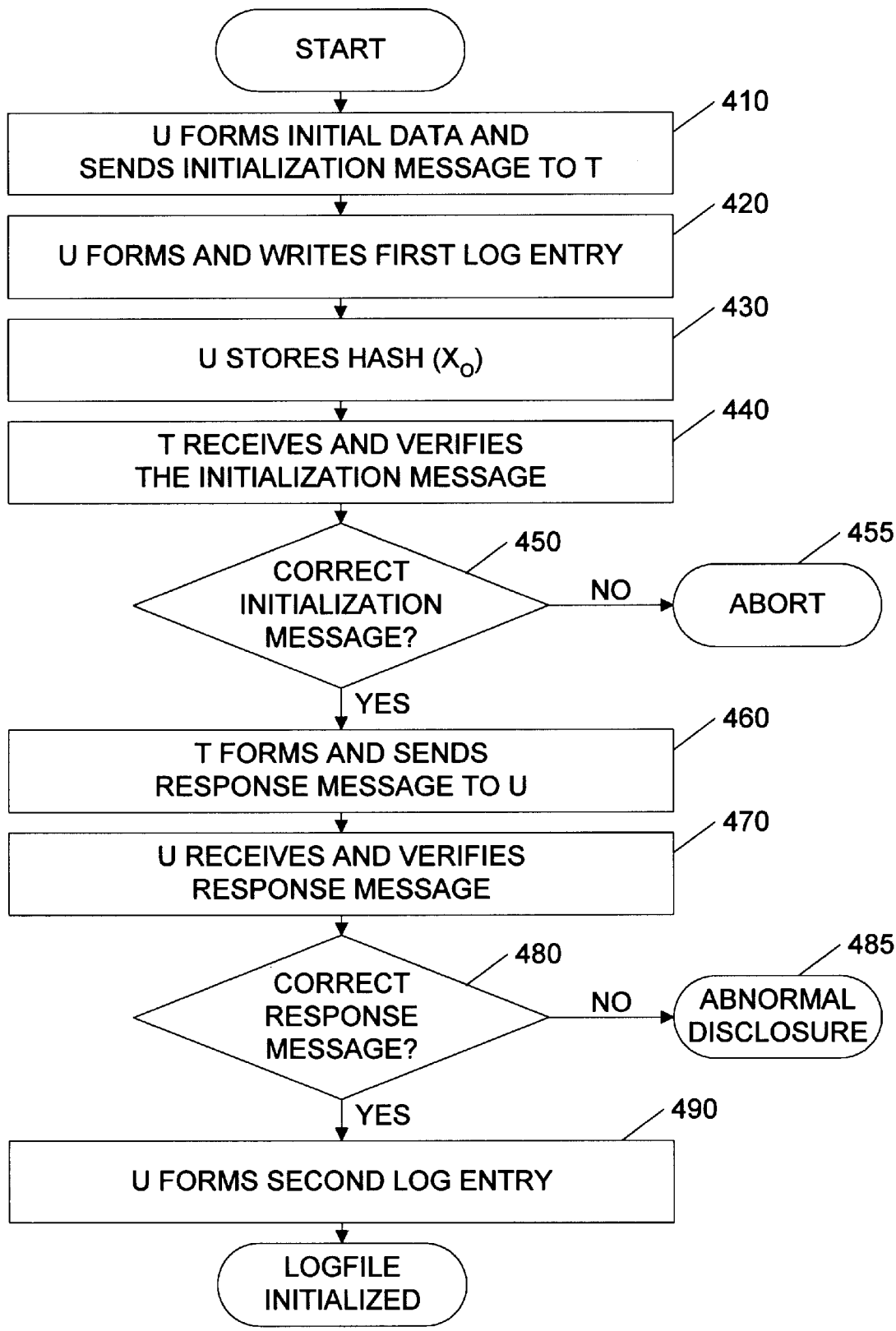
FIG. 4 illustrates one embodiment of a startup protocol for initializing the audit log.

The untrusted machine, U, and its logging partner (here, the trusted machine T) must first establish a private & authenticated connection, and prove their identities to one another. The details of this are available in any number of existing protocols, e.g., SSL, and need not be described in detail here. (SSL is an Internet protocol designed to provide authentication and key exchange. It was developed by Netscape Corporation and its details are publically available on the Internet's World Wide Web.) To prevent future fraud by the untrusted machine, U should not be able to later read a recorded transcript of this session; however, it's fine if T can read it later. Once this connection is established, the following mutual verification protocol is sent through the connection as depicted in FIG. 4:

i. At step 410, U forms
   (a) $K_o$, a random starting encryption key,
   (b) $d_o$, a current timestamp,
   (c) $d^+$, a timestamp at which U will time out,
   (d) $ID_{log}$, a unique identifier for this logfile,
   (e) $C_U$, U's public key digital certificate (typically from T itself),
   (f) $A_o$, a random starting authentication key,
   (g) p, a protocol-step identifier that prevents steps in a protocol from being revised (see, e.g., R. Anderson, "Robustness Principles for Public Key Protocols," Advances in Cryptology—CRYPTO '95, Springer-Verlag, 1995, pp. 236–247), and
   (h) $X_o$=p, $d_0$, $ID_{log}$, $C_U$, $A_o$.

U then forms and sends to T the initialization message $M_o$=(p, $ID_U$, $PKE_{PKT}(K_o)$, $E_{Ko}(X_o, SIGN_{SKU}(X_o))$).

ii. At step 420, U forms the first log entry $L_o$ with $W_o$=LogfileInitializationCode and $D_o$=d, $d^+$, $ID_{log}$, $M_o$.

iii. At step 430, U also stores hash ($X_o$) locally while waiting for the response message. Depending on the application, U may or may not be allowed to log anything before the arrival of the response message.

iv. At step 440, T receives and verifies the initialization message by using its private key to decrypt the encrypted encryption key, using the encryption key to decrypt $X_o$, and verifying the authenticity and integrity of digitally-signed $X_o$ using U's digital certificate.

v. At step 450, T checks if the initialization message is correct. If so, at step 460, T forms $X_1$=P, G, hash ($X_o$) and forms and sends to U the response message $$M_1 = p, ID_T, PKE_{PKU}(K_o), EA_{Ko}(X_1, SIGN_{SKT}(X_1)).$$

Else, at step 455, T aborts the startup protocol by simply refusing to respond to U.

vi. At step 470, U receives and verifies the response message in a similar fashion to T's verification of the initialization message, and using hash ($X_o$) stored from step 420. Depending on the application, we may or may not allow U to log anything between the time it sends $M_o$ and the time it receives $M_1$. In high-security applications, we might not want to take the chance that there are any problems with T or the communications. In other applications, it might be allowable for U to perform some actions while waiting for T to respond.

vii. At step 480, U checks to see if the response message is correct. If so, at step 490, U forms a second log entry $L_1$ with $W_1$=ResponseMessageCode and $D_1$=$M_1$. U also calculates $A_1$=hash ($A_o$). The logfile is then ready for use. The use of subscript "1" in the foregoing assumes that U has not been allowed to write anything to the log between the time U sends $M_o$ and the time receives $M_1$. If U is allowed to write to the log during this time, the subscripts on L, W, and D would be "j" (j>1) rather than "1."

viii. Otherwise, at step 485, if U doesn't receive $M_1$ by the timeout time $d^+$, or if $M_1$ is invalid, U forms a second log entry with $W_1$=AbnormalCloseCode and $D_1$=the current timestamp plus a (textual or numeric code) reason for closure. The logfile is then closed.

The purpose of writing the abnormal close message is simply to prevent there ever being a case where, due to a communications failure, T thinks there is a logfile being used, but none exists. Without this, an attacker could delete U's whole logfile after compromising it, and claim to simply have failed to receive the final protocol message from (step 470 of) the startup. In implementations where U waits for the response message before writing any log entries, $M_1$ will be the second message written in the log as well as the last. Otherwise, when T sees this message, he will believe either that U didn't receive the response message, or that U was compromised before the response message.

In practice, starting up a logfile is a rare occurrence, and can therefore justify the use of a faster connection (e.g., a direct dial-in) than would be used in subsequent communications. Of course, in many practical applications, U and T will be directly connected in a protected environment, in which case the secure connection and mutual identification has already been taken care of. At the other extreme, it is possible to perform the startup process without an on-line connection (as will be described later). This, however, is less secure because it gives T no guarantee of U's initial trustworthiness.

b. Writing

Figure 5:
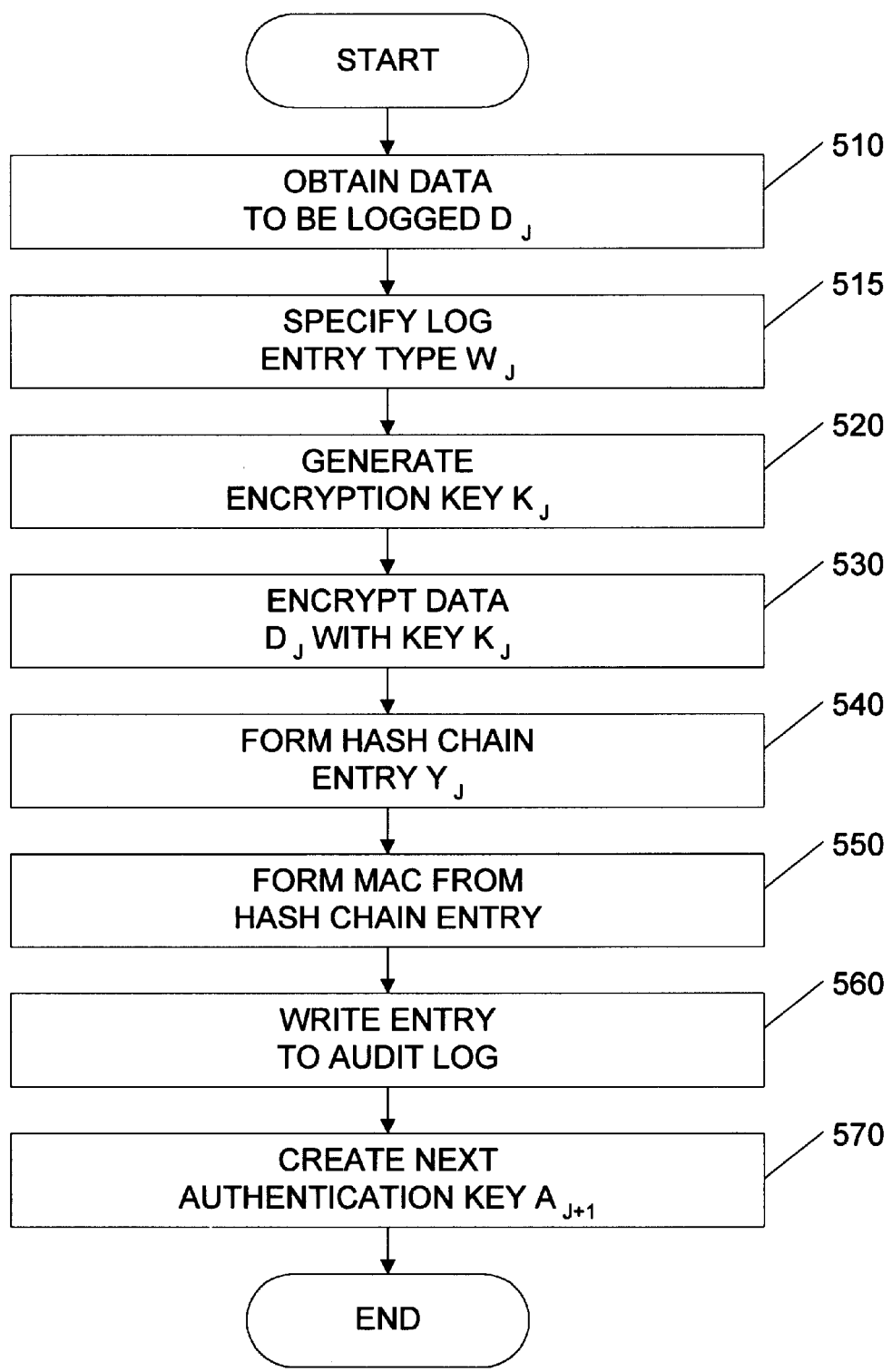
FIG. 5 illustrates one embodiment of a protocol for writing an entry into the audit log.

Once the logfile has been created and the initial secrets exchanged, the logfile is initialized for writing. FIG. 5 shows the process steps by which U adds an entry to the audit log 300. At step 510, the specific data $D_j$ to be logged in the entry is obtained (e.g., generated by a program running on the computer 102, or obtained in real-time from its input device 145, or aggregated in its storage device 160, or obtained from a remote device accessed via external interface 180). In general, the data can include raw binary data, text, program code, and any other information storable in a computer-readable format. The specific data format of $D_j$ is not restricted; it need only be something that a verifier of the log entries will unambiguously understand, and that can be distinguished virtually all cases from random gibberish. That is, the data must enable detection of an altered record by making it decrypt to an obviously incorrect answer. Structure can optionally be imposed on the data to help the verifier perform such detection. This is especially useful where the data are to be provided to a partially trusted verifier, but who is not authorized to receive the authentication key used to create the MAC that absolutely guarantees the data (as will be discussed in greater detail below). For example, where the data are CBC-mode block ciphers or standard stream ciphers, a very simple checksum at the end of the message will be sufficient. In other cases, a hash operator might be appropriate.

$W_j$ is the log entry type of the j-th log entry. At step 515, the log entry type appropriate to the data is specified. The details are necessarily implementation-specific but the log entry type might typically be a fixed length (e.g., 32-bit) word having a small number of values (e.g., in the example described previously, the range from 0xffffff00 to 0xffffffff) reserved for system use, with all others being available for the application program to define as necessary. The log entry type can serve as categories of error message, and also for access control: partially-trusted users can be given or denied access to various log entries based upon their types. Thus, the log entry type is also called a permission mask. In an exemplary embodiment of the invention, permission masks are determined according to a universal, public standard. Thus, anyone knowing the identity of a partially-trusted user can determine an appropriate permission mask.

$A_j$=hash ("Increment Hash", $A_{j-1}$) is the authentication key used in the MAC that provides cryptographically verifiable authenticity of the j-th entry in the log. The log's authentication key is hashed immediately after a log entry is written, creating a new value for the authentication key that overwrites and irretrievably deletes the previous value. The authentication key for the current log entry is therefore created at step 570 of the previous log entry. The original value, $A_0$, is given to U by T at startup using the process described previously. Alternatively, U can generate $A_o$ and then securely transmit it to T (who will need $A_0$ for log verification, described later). By changing authentication keys each time, and never storing past values, even if U becomes compromised the security of entries prior to the compromise remains intact.

$K_j$=hash ("Encryption Key", $W_j$, $A_j$) is the symmetric key used to encrypt the j-th entry in the log. It is therefore also able to decrypt the j-th entry in the log. At step 520, the log entry's encryption key is derived, using the aforementioned one-way process, from that entry's authentication key and, at step 530, the data are encrypted. This makes it possible to give encryption keys for individual logs out to partially-trusted users or entities (so that they can decrypt and read entries), without allowing those users or entities to make undetectable changes via access to the authentication key. As discussed below, encryption keys are destroyed immediately after use, so before the partially-trusted user can be given an encryption key, it must be regenerated in the same fashion described above. Because the encryption keys for each log entry are derived partly from the permission mask, and the permission mask is part of the partially-trusted user's request, a partially-trusted user who lies about the type of a given log entry will be prevented from receiving the right key. Thus, the permission mask serves to define roles in a role-based security scheme. Use of the permission mask will be discussed in greater detail below in the section entitled "Verification."

$Y_j$=hash ($Y_{j-1}$, $E_{Kj}$ ($D_j$), $W_j$) is a hash chain entry linking the present log entry to past log entry values. This hash chain entry is formed at step 540. Each hash chain entry is derived from the previous hash chain entry, and thus serves to authenticate the values of all previous log entries. The hash chain entry is therefore an exemplary verification chain entry, and those skilled in the art will recognize that many different such verification chain entries may be used within the scope of this invention. The verification chain is initialized at startup by defining $Y_o$ to be a twenty-byte block of binary zeros. The hash chain can be given to partially-trusted verifiers via a low-bandwidth connection with the trusted machine T, allowing them to verify parts of the log.

$Z_j$=$MAC_{Aj}$ ($Y_j$) is an authenticatable MAC of the hash chain entry that provides the strong security of the invention. It is formed at step 550. By making the hash chain entry $Y_j$ authenticatable, an entity having the authentication key $A_j$ can remotely verify all previous log entries by authenticating a single 160-bit hash value. $Z_j$ is written, along with the permission mask, encrypted data, and hash chain, into the j-th log entry $L_j$=$W_j$, $E_{Kj}$ ($D_j$), $Y_j$, $Z_j$ at step 560.

At step 570, $A_{j+1}$ (the authentication key for the next log entry) is computed and stored, and $A_j$ is irretrievably destroyed. Likewise, encryption key $K_j$, which is derived from $A_j$, is also destroyed after use because the next entry's key $K_{j+1}$, is derived only from $A_{j+1}$. No copies of these keys are kept on U while it is still under secure control (i.e., operating normally). (Naturally, an attacker will probably begin storing these values if he successfully takes control of U.)

The above procedure cleanly defines how to write the j-th entry into the log, given $A_{j-1}$, $Y_{j-1}$, and $D_j$. They also make it clear why it is not possible to write a valid entry into position j without access to $A_j$ or some earlier A value.

C. Posting

During the writing process, untrusted machine U may occasionally write out (either to storage device 160 or to verifier 103 via external interface 180) a posting record. This is a special kind of record containing sufficient information to enable its recipient to verify a limited subset of the logfile's entries without being able to modify those entries. Thus, a posting record is well-suited for use with a partially-trusted verifier. A posting record includes a log entry type of 0xffffff004 and a four-byte data field containing a timestamp This information, along with the chaining information normally provided with a log entry record, can allow either T or V to verify previous entries using the verificaion procedures below.

d. Closing

The last step, after all writing and positing is complete, is closing. Closing the logfile involves writing a "final record" message (a log entry code of 0 xfffff005, plus data in the form of a four byte timestamp), deleting the final A and K values, and (in some implementations) actually closing the file. Note that after the file has been properly closed. an attacker who has taken control of U cannot make any alteration to the logfile without detection. Nor can an attacker delete some entries (and possibly add others) and then create a valid close-file entry earlier in the log. The only thing an attacker can do is delete the entire log file.

E. Verification and/or Reading of the Logfile by T

After U closes the log, he may send it to T who can validate the log using the hash chain and $Z_f$. T can also derive the encryption keys, for each entry in the log, by extracting $A_o$ and $K_o$ from the initialization message and using the log entry types to derive subsequent encryption and authentication keys. Thus, T can read all the entries in the log.

F. Verification by a Partially Trusted Verifier

Figure 6:
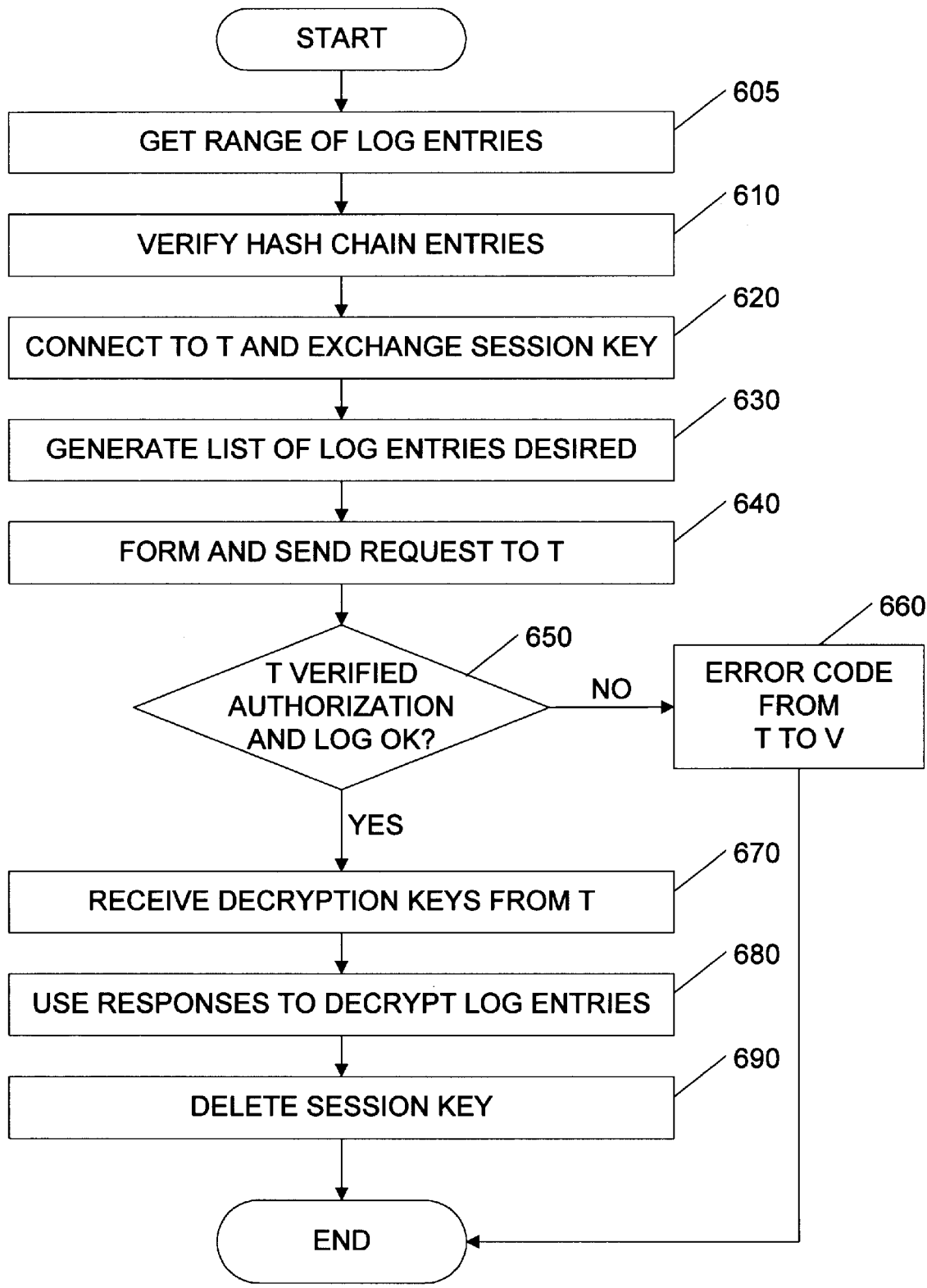
FIG. 6 illustrates one embodiment of a protocol for verification by a partially trusted verifier.

The foregoing describes verification and access by T. At other times, a partially-trusted person or machine, called V, may need to verify or read some of the logfile's records. This assumes that T has sent V the response message $M_1$, and that V has a high-bandwidth channel available to and from U. As shown in FIG. 6, at step 605, V would be given access to a range of entries from $L_o$ to $L_f$, and would seek to actually read the data in some (not necessarily contiguous) subset of those entries. V can be given the entries by either U or T; in the former, before T has a copy of the log and before U has even closed the logfile. To verify the desired subset:

1. At step 610, V goes through the log entries $L_o$ to $L_f$, verifying that each entry $Y_j$ in the hash chain is correct. Each hash chain entry $Y_j$=hash ($Y_{j-1}$, $E_{Kj}$ ($D_j$), $W_j$) can be verified by using the hash chain, encrypted data, and log entry type values for the immediately preceding hash chain entry from its log entry value. The starting values $W_o$ and $E_{Ko}$ ($D_o$) are known from $L_o$, and $Y_o$ is known to be defined as a block of binary zeros. Thus, the hash chain entries can be verified recursively starting from information available in the sequence of accessible log entries.

2. At step 620, V establishes a secure connection of some kind with T, over what could be a low-bandwidth connection, using a key agreement mechanism to generate a session key such that V cannot recover the session key if V is later compromised. This also uniquely identifies the verifier to T. (A session key is a term well understood in the art of cryptography. It is a random key used for a single communications session between two parties, in this case between V and T. There are many key-agreement algorithms and protocols that can be used to generate a session key; "Applied Cryptography, Second Edition" discusses many of them.)

3. At step 630, V generates a list of all the log entries whose data V wishes to read, from 0 to n. This list contains a representation of the index and log entry type of each entry to whose data $D_j$ the verifier is requesting access. Typically, only some log entry types will be allowed; thus, the list of entries will not necessarily be continuous, but rather a subset of the full audit log. In the case where the subset equals the full log, n=f, the index of the final log entry. As a matter of convenience, the term subset shall be used herein to denote either the partial of the full set. The list is called Q[0..n].

4. At step 640, V forms and sends to T $M_2$=p, $ID_{log}$, f, $Y_f$, $Z_f$, Q[0..n].

where f (n≦f) is the index value of the final record to which V is allowed access.

5. At step 650, T verifies that V is authorized to work with this log, and that this log has been properly created: T knows $A_o$ and can therefore calculate $A_f$ and verify that $Z_f$=MAC$_{Af}$($Y_f$)

6. At step 660, if there is a problem, T sends back an error code to V and records that there is a problem with $ID_{log}$ on U.

7. At step 670, if there are no problems, T forms a list, R[0..n], of responses to the requests in Q. Each entry in Q gets a responding entry in R—either giving the verifier the decryption key for that record, or else giving it an error code describing the reason for the refusal of access. Typically, this will be because the log entry type (i.e., permission mask) isn't allowed to be read by this verifier. Note that T computes the decryption keys based on the log entry types given. If the code is incorrect, the decryption key will be incorrect, and the partially-trusted verifier will have no way to learn the right key from the key he has been given. Thus, V can not lie about the log entry type to gain access to a log entry type he is banned from accessing.

8. At step 680, T forms and send to V $M_3$=p, R[0..n].

V is now able to decrypt, but not to change, the data in the log entries whose keys were sent in R. The verifier is also convinced that the log entries are validly MAC'd, since a correct MAC on any hash-chain value is essentially a MAC on all previous entries, as well.

9. At step 690, V deletes the session key it established with T at step 2. This guarantees that an attacker can not read U's logfile even if V is later compromised.

G. Enhancements and Alternate Embodiments of the Invention

1. Non-Rewritable Storage

Figure 7:
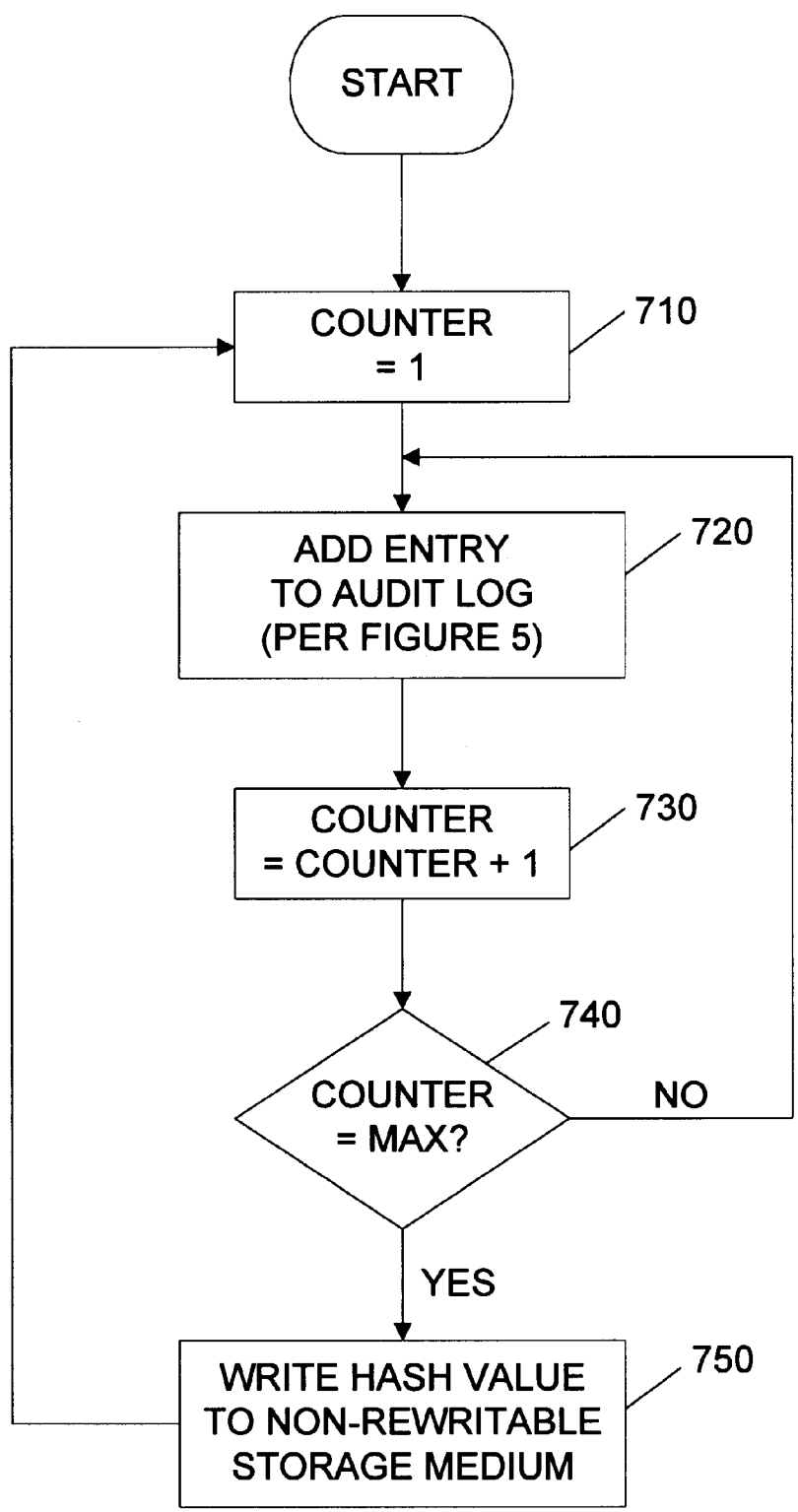
FIG. 7 illustrates writing hash values to a non-rewritable medium.

Still further security is obtained by recording the current hash value to a secure storage device 170 at preset intervals. Secure storage device 170 could be part of untrusted machine 102, or connected thereto via external interface 180 (possibly across a network). As mentioned previously, it need not even be an electronic device. For example, at the end of the day the current hash value could be displayed on a screen and then written into a paper logbook. Alternatively, every 100 entries, the current hash value could be transmitted via electronic mail to a trusted data repository. The inaccessibility of, or difficulty in modifying, the secure storage device makes it difficult for an attacker to successfully modify the audit log. FIG. 7 shows the process steps for an embodiment of this idea. At step 710, a counter is initialized to one. At step 720, the current entry is added to the audit log 300. At step 730, the counter is incremented by one. At step 740, if the counter equals its maximum value, (e.g., one hundred), then at step 750 the current hash value is written to non-rewritable storage device 170 and the counter is reset to one.

2. Public Key Encryption

Asymmetric (or "public-key") cryptography algorithms have two keys: one for encryption and the other for decryption. The encryption key can be used to encrypt data, but cannot be used to decrypt it, and the decryption key can be used to decrypt data, but cannot be used to encrypt it. Furthermore, knowledge of the encryption key does not allow one to derive the decryption key. The encryption key is the so-called private key and the decryption key is the so-called public key. Public-key encryption techniques and algorithms are well known in the art of cryptography (again see "Applied Cryptography") and include such well-known algorithms as RSA, DSA, and E1 Gamal.

As one skilled in the art will appreciate, the protocols described thus far can be modified to use additional security features afforded by public key cryptography. For example, the data to be logged can be encrypted with the public key of the intended recipient, so that it can be decrypted only by the intended recipient (through use of his private key). In some cases, this may provide sufficient security that the symmetric encryption key is eliminated entirely. Or, the data can be encrypted with only the symmetric encryption key (as before), with the symmetric encryption key subsequently distributed using public key encryption for added security. Still other possibilities include one-time public key encryption where each subsequent log entry is assured with a public encryption key that is derived, in part, using one-way operation on a previous log entry's public encryption key. These and still other variations of public key cryptography may be used to argument, or to replace, the symmetric cryptographic operations disclosed in the above-described embodiment of the invention, as will be appreciated by one skilled in the art. In all these cases, because the encryption key and decryption key are different, the latter need not be stored in the audit logging program, but can be securely stored somewhere off-line. Hence there is no way for an attacker to decrypt entries in the audit log.

3. Public Key Digital Signatures

When some or all of the processes described above with respect to public key cryptography are reversed—i.e., the private key is used for encryption (signing) and the public key is used for decryption (authentication)—the process is known as digital signing. This can be used to guarantee the authenticity of (and to ensure non-reputability of) the digitally signed quantity. Digital signing, like public key encryption, is a well-known use of asymmetric cryptography and need not be described in detail here.

4. Reduced Bandwidth Embodiments

Under some circumstances, it may be desirable to reduce the bandwidth requirement between T and U for initializing the logfile. For example, in a completely off-line environment, couriers (e.g., carrying diskettes) could be used to transfer $M_0$ and $M_1$ between T and U. If a voice channel is available, someone could also read the hash of $M_0$ from U (and/or $M_1$ from T) over the line for additional security.

It is also possible to reduce the entire initialization protocol to messages that can be sent over a voice line directly, either by reading them over the line or by using DTMF tones. In such a case, $ID_U$, $ID_{log}$, and hash ($M_0$) will be sent over the telephone line by prompting the user to press telephone keypad buttons. In practice, all messages in this protocol can probably be reduced down to 22 digits or, with the SHA-1 hash function, to only 20 digits. This will provide resistance against practical attacks that do not involve compromise of U before the logfile is created.

5. Complementary Process Logging

By writing a hash value to a secure medium, the attacker is prevented from accessing all the hash values he would need to modify the audit log. A similar concept involves obtaining a hash value from an external source. In particular, consider applications where multiple audit logs are kept by multiple processes: for example, multiple computers on a single network keeping audit logs of interactions between them, or hand-held electronic wallets keeping audit logs of transactions between wallets, or ATM cash dispensing machines and bank computers keeping audit logs of their interactions. In applications such as these, each audit log can include the current hash value of its own as well as the other processes involved in the transaction (the "complementary process"). The other process data may be obtained via external interface 180. Thus, entries in such an audit log (which may be referred to as a "hash lattice") will include an additional field for the one-way hash of a transaction completed by a complementary process. Such entries can be done periodically, in a manner analogous to FIG. 4, or even for every entry. This technique provides and alternative to storing the current hash value off-line by using the other processes in the system as trusted storage. Someone wanting to modify an entry in a particular audit log would have to figure out which other processes were involved in the audited transactions immediately proceeding and immediately following the entry being modified. In a large and complicated network, this can easily turn into an impossible task.

Figure 8:
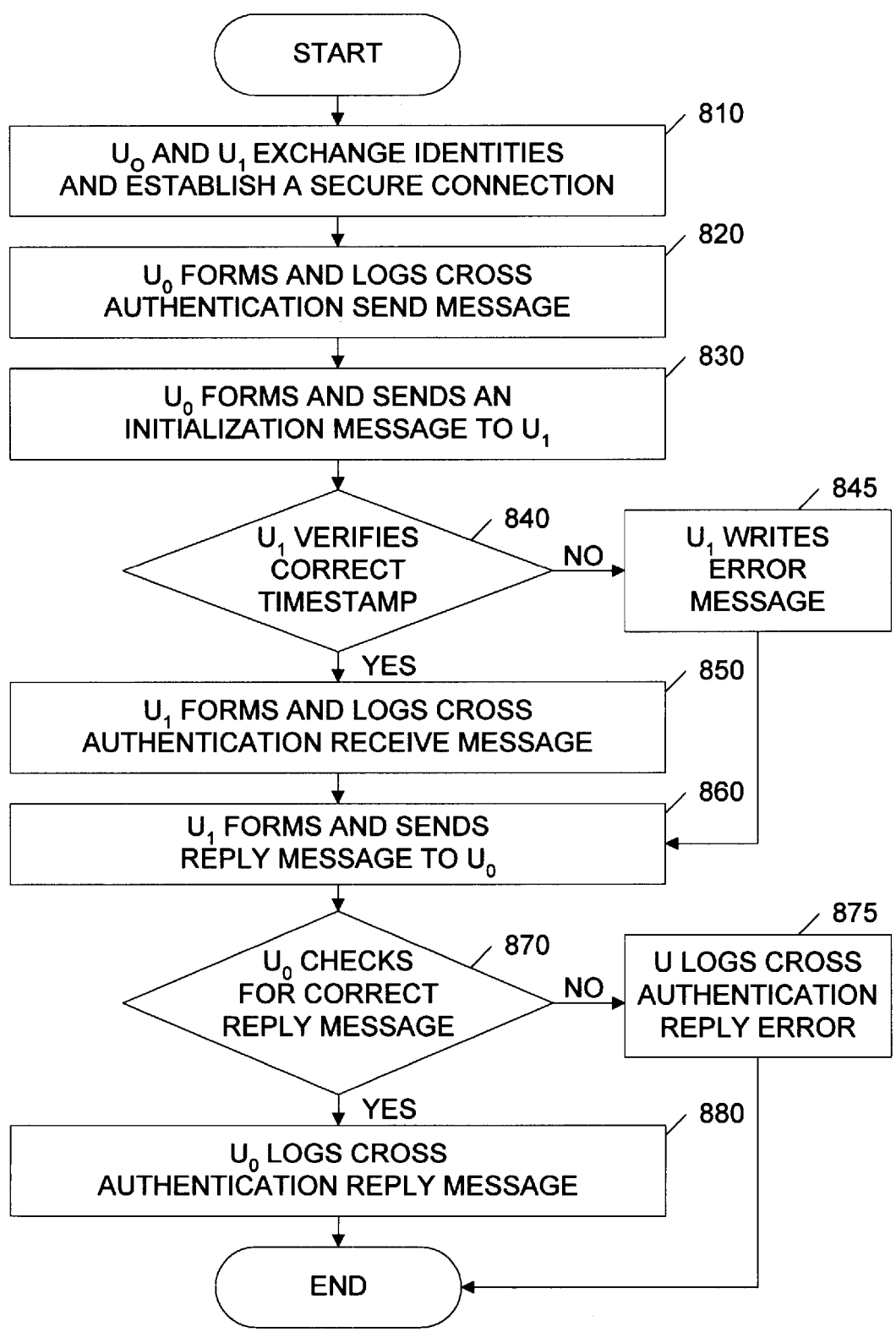
FIG. 8 illustrates one embodiment of a cross-authentication protocol.

FIG. 8 describes a cross-authentication that may be done in addition to the rest of the logging scheme as described previously. Here, one untrusted machine serves as a logging partner for another untrusted machine. To cross-authenticate between two untrusted machines, $U_0$ and $U_1$, whose current values are denoted by subscripts j and i, respectively, we execute the following protocol:

a. At step 810, $U_0$ and $U_1$ exchange identities and establish a secure connection.

b. At step 820, $U_0$ forms and enters into its own log an entry, in position j, with:
   $W_j$=Cross Authentication Send,
   $D_j$="Cross Authentication Send", $ID_{U1}$, $d_0$
   where $d_0$ is $U_0$'s timestamp.

c. At step 830, $U_0$ forms and sends to $U_1$:
   $M_4$=p, $Y_j$, $d_0$.
   Recall that $Y_j$ is the current value of $U_0$'s hash chain.

d. At step 840, $U_1$ receives this message, and verifies that the timestamp is approximately correct. If so, at step 850, $U_1$ writes a log entry in position i with:
   $W_i$=Cross Authentication Receive,
   $D_i$="Cross Authentication Receive", $ID_{U_0}$, $d_0$, $Y_j$.
   Here, $d_1$ is $U_1$'s timestamp. Then, at step 860, $U_1$ forms and sends to $U_0$
   $M_5$=p, $Y_i$.

e. At step 845, if $U_1$ doesn't agree with the timestamp, it writes a log entry, in position i, with:
   $W_i$=Cross Authentication Receive Error,
   $D_i$="Cross Authentication Receive Error", $ID_{U_0}$, $d_0$, $d_1$ $Y_j$,
   where $d_1$ is $U_1$'s timestamp. Then, at step 860, $U_1$ forms and sends to $U_0$:
   $M_5$=p, ErrorCode.

f. At step 870, $U_0$ receives $M_5$ and processes it. At step 875, if there was an error, or if the expected message dosen't arrive before timeout, then $U_0$ writes an entry to the log at position j+1 with:
   $W_{j+1}$=Cross Authentication Reply Error,
   $D_{j+1}$="Cross Authentication Reply Error", $ID_{U1}$, ErrorCode.

Else, at step 880, if there was no error in receiving $M_5$, and if $M_5$ was not an error message, then $U_0$ writes an entry to its log, at position j+1, with:
   $W_{j+1}$=Cross Authentication Reply,
   $D_{j+1}$="Cross Authentication Reply", $ID_{U1}$, $Y_i$.

If mutual cross-peer linking is required, then $U_1$ could initiate the above-described protocol with $U_0$. All of the foregoing assumes that the two trusted machines execute the same basic logging protocol, but this is not strictly necessary; it is only necessary that the two machines understand enough of each other's protocols to determine whether correct or incorrect messages have been sent and received. An exemplary application of the above protocol is to a network of electronic wallets. The wallets (machines U) would exchange money with each other regularly, and occasionally come in contact with a banking terminal T. The hash lattice could help the bank reconstruct fraudulent transactions and trace wallets whose tamper-resistance has been defeated.

6. Replacing T with a Network of Insecure Peers

An alternate embodiment of this scheme involves using multiple untrusted machines $U_1, \ldots, U_n$ to do all the tasks of logging partner T. Thus, instead of a single T we have a distributed entity of U machines, thus leading to better security in some applications. In applications where a single large target for attack (a single T) is undesirable, this embodiment is preferable.

Doing this involves an extension of the hash lattice ideas from the previous section. As a matter of convenience, the term "trusted server" (or "trusted machine") may be understood to refer to these logging partners $U_j$ (j=1 to n), even though they are in fact untrusted.

For example, in a 2-machine embodiment, let $U_0$ and $U_1$ both be untrusted machines, with $U_0$ about to start an audit log and $U_1$ serving as the trusted server for this audit log. An exemplary mutual verification protocol between $U_0$ and $U_1$ is as follows:

1. $U_0$ and $U_1$ establish a secure connection.
2. $U_0$ forms:
   d, a current timestamp,
   $d^+$, timestamp at which $U_0$ will time out,
   $ID_{log}$, a unique identifier for this logfile,
   $A_0$, a random starting point, and
   $X_0 = p, ID_{Uo}, ID_{U1}, d, ID_{log}, A_0$,
   where $ID_{Uo}$, and $ID_{U1}$ are unique identifiers for $U_0$ and $U_1$, respectively.
   $U_0$ then forms and sends to $U_1$
   $M_0 = X_0$.
3. $U_0$ forms its first log entry, $L_0$, with:
   $W_0$=LogfileInitializationCode, and
   $D_0 = d, d^+, ID_{log}, M_0$.
   Note that the initial hash chain value ($Y_0$), the initial session key ($K_0$), and other parameters needed for $L_0$ are generated as described previously in the section entitled "Writing." $U_0$ also calculates hash($X_0$) locally while waiting for the response message.
4. $U_1$ receives and verifies $M_0$. If it is correct, then $U_1$ forms:
   $X_1 = p, ID_{log}$, hash($X_0$)
   $U_1$ then forms and sends to $U_0$:
   $M_1 = X_1$.
5. $U_0$ receives and verifies $M_1$. If $U_0$ doesn't receive $M_1$ by the timeout time $d^+$, or if $M_1$ is invalid, then $U_0$ forms a new log entry $L_j$ with:
   $W_j$=AbnormalCloseCode, and
   $D_j$=the current timestamp and the reason for closure.
The log file is then closed. Else, if all is well, $U_0$ forms a new log entry, $L_j$, with:
   $W_j$=ResponseMessageCode, and
   $D_j = M_1$,
   and continues with the protocol. As before, if $U_0$ is not permitted to log anything before receiving the response, j=1; but if $U_o$ can log entries before receiving the response, then j>1.

The foregoing illustrates a one-server (i.e., two machine) embodiment of the invention. As such, it is possible that an attacker may compromise $U_1$, allowing the wholesale alteration of entries in the logfile. In one exemplary solution to this problem, $U_0$ could log the same data in several parallel logfiles, with each logfile using a different untrusted server (i.e., $U_k$, k≧1) as its server.

In another exemplary solution to this problem, $U_0$ could commit, in the first protocol message, to a number N that will be the index number of its final log entry. $U_1$ then computes $A_N$ (recursively from $A_0$) and $K_0, \ldots, K_N$ (using known values of $A_j$ and $W_j$, j=0 to N specified by U) stores these values, and deletes $A_0$. If an attacker compromises $U_1$, he will learn what he needs to read and to close the logfile on $U_0$, but not what he needs to alter any other log entries. It is worth noting that these measures do not protect the secrecy of a logfile once an attacker has compromised both $U_0$ and its server(s).

In another exemplary solution to the problem, $U_0$ could use a secret-sharing scheme to store $A_0$ (or some other logging parameter) among n untrusted machines, any k of which could then recover $A_0$. Secret sharing schemes are also well known in the art of cryptography; they are described in detail in "Applied Cryptography, Second Edition."

Yet another exemplary solution is for $U_0$ to keep parallel log files in the manner described above on n machines, but generating (for each log entry that needed to be kept secret) n−1 pad values, e.g., random bit strings of length equal to that of $D_j$. $U_0$ then stores $D_j \oplus Pad_0 \oplus Pad_1 \oplus \ldots \oplus Pad_{n-2}$ in one logfile, and each pad value in another logfile.

All of the foregoing "distributed logging schemes," and other variants thereof that will be understood to those skilled in the art, can be used for authenticating the log entries with various degrees of protection for the log files' secrecy.

7. Single Key Verification Chains

The foregoing illustrates various embodiments of the invention using both an encryption key and an authentication key, both such keys for a given entry being derived by hashing the corresponding keys for a preceding entry. Although such a 2-key embodiment has many advantages, including the decoupling of hash chain verification from log entry access, those skilled in the art will appreciate that such a 2-key embodiment is not strictly necessary. Rather, the fundamental security of this invention lies in a verification (e.g., hash) chain wherein an entry-specific cryptographic key (whether an encryption key, an authentication key, or both) that is linked to at least part of a preceding entry's key (i.e., by a cryptographically verifiable function, denoted generically as a "hash") is used to perform a verifiable cryptographic operation on at least part of a preceding verification chain entry to generate a current verification chain entry.

For example, in an exemplary encrypted verification chain:
   $K_j$=hash ($K_{j-1}$), and
   $Y_j$=hash ($Y_{j-1}, E_{Kj}(D_j)$).
In this example, $K_j$ is the cryptographic key and a hash is the verifiable cryptographic operation.

Alternatively, in an exemplary authenticated verification chain:
   $K_j$=hash ($K_{j-1}$), and
   $A_j = MAC_{Aj} (A_{j-1}, D_j)$.
In this example, $K_j$ is the cryptographic key and a MAC is the verifiable cryptographic operation. In the above examples, the quantity $D_j$ denotes the datum described previously, and/or possibly a permission mask if use of such a quantity is desired. Thus the two examples above can be combined, together with the concept of a permission mask, to form the dual-key embodiment disclosed previously. Therefore, those skilled in the art will appreciate that the techniques disclosed previously (e.g., in sections 1–6 above) with respect to the dual-key embodiment may also be used with a single-key embodiment.

All of the foregoing shows that the method and apparatus of the present invention may be implemented using numerous variations and modifications to the exemplary embodiments described herein, as would be known to one skilled in the art. Thus, it is intended that the scope of the present invention be limited only with regard to the claims listed below.

What is claimed is:

1. A method for creating an audit log entry having enhanced security against tampering, comprising the steps of:
   (a) receiving a quantity to be logged;
   (b) concatenating said quantity with at least a portion of a verification chain entry for a preceding entry;
   (c) using an entry-specific cryptographic key having been derived by computing a cryptographic hash on at least a cryptographic key for a preceding entry, performing a verifiable cryptographic operation on the result of step (b) to generate a current verification chain entry; and
   (d) writing, to a memory, an audit log entry including said quantity and said generated verification chain entry.

2. The method of claim 1 further comprising the step of generating a cryptographic key usable for a subsequently generated audit log entry by computing a cryptographic hash on said entry-specific cryptographic key.

3. The method of claim 2 further comprising the step of deleting said entry-specific cryptographic key.

4. The method of claim 1 wherein said verifiable cryptographic operation is an encryption operation using said entry-specific cryptographic key.

5. The method of claim 4 wherein said verifiable cryptographic operation is a MAC operation using said entry-specific cryptographic key as an authentication key for said MAC.

6. The method of claim 1 where said quantity includes a datum.

7. The method of claim 6 where said datum is an encrypted value.

8. The method of claim 1 where:
   (a) said quantity includes a permission mask; and
   (b) said entry-specific cryptographic key depends on:
      (i) said permission mask, in addition to
      (ii) said cryptographic key for said preceding entry.

9. The method of claim 1 comprising the step, prior to said step of receiving said datum, of establishing mutually verified communications with a logging partner.

10. The method of claim 9 wherein said logging partner is a trusted computer.

11. The method of claim 9 wherein said logging partner is an untrusted computer.

12. The method of claim 11 further comprising the step of committing, to said untrusted computer, an information pertaining to a final audit log entry.

13. The method of claim 11 wherein said logging partner is part of a distributed logging scheme involving a plurality of untrusted computers.

14. The method of claim 13 wherein said distributed logging scheme includes maintaining parallel logfiles on at least some of said untrusted computers.

15. The method of claim 14 further comprising storing said quantity plus at least one pad value in at least some of said logfiles.

16. The method of claim 13 where said distributed logging scheme includes using a secret sharing scheme to store a logging parameter among at least some of said untrusted machines.

17. The method of claim 1 where said step of writing said audit log entry to said memory includes writing said audit log entry to a non-rewritable medium.

18. The method of claim 1 wherein step (b) further comprises including a value from a complementary audit log process in said verification chain entry.

19. The method of claim 1 further comprising the step of transmitting said audit log entry to a trusted computer.

20. The method of claim 8 further comprising the step of transmitting said audit log entry to a partially trusted verifier.

21. The method of claim 1 further comprising the use of an asymmetric cryptographic operation in at least one of steps (a), (b), and (c).

22. The method of claim 1 where said step of writing said audit log entry to said memory includes writing said audit log entry to an electronic wallet.

23. A computer-readable medium embodying a software program for creating an audit log entry having enhanced security against tampering, said software program comprising:
   (a) program code configured to receive a quantity to be logged;
   (b) program code configured to concatenate said quantity with at least a portion of a verification chain entry for a preceding entry;
   (c) program code configured to use an entry-specific cryptographic key that was derived by computing a cryptographic hash on at least a cryptographic key for a preceding entry, to perform a verifiable cryptographic operation on the result of step (b) to generate a current verification chain entry; and
   (d) program code configured to write, to a memory, an audit log entry including said quantity and said generated verification chain entry.

24. The software program of claim 23 contained in an electronic wallet.

25. A computer-readable medium comprising a data structure for use as an audit log entry having enhanced security against tampering, said data structure including:
   (a) a logged quantity; and
   (b) a verification chain entry comprising a verifiable cryptographic representation of:
      (i) at least a portion of a preceding verification chain entry, and
      (ii) said logged quantity;
   said cryptographic representation having been computed using an entry-specific cryptographic key that was derived by computing a cryptographic hash on at least a cryptographic key for said preceding entry.

26. The computer-readable medium of claim 25 comprising an electronic wallet.

27. The computer-readable medium of claim 25, said verifiable cryptographic operation being an encryption operation using said entry-specific cryptographic key.

28. The computer-readable medium of claim 25, said verifiable cryptographic operation being a MAC operation using said entry-specific cryptographic key as an authentication key for said MAC.

29. The computer-readable medium of claim 25 where said logged quantity includes a datum.

30. The computer-readable medium of claim 25 where said datum is an encrypted value.

31. The computer-readable medium of claim 25 where:
(a) said logged quantity includes a permission mask, and
(b) said entry-specific cryptographic key depends on:
 (i) said permission mask, in addition to
 (ii) said cryptographic key for said preceding entry.

32. The computer-readable medium of claim 31 further comprising initialization information evidencing the status of mutually verified communication with a logging partner.

33. The computer-readable medium of claim 32 wherein said logging partner is a trusted computer.

34. The computer-readable medium of claim 32 wherein said logging partner is an untrusted computer.

35. The computer-readable medium of claim 34 wherein said mutually verified communication includes a commitment to an information pertaining to a final audit log entry.

36. The computer-readable medium of claim 34 wherein said logging partner is part of a distributed logging scheme using a plurality of untrusted computers.

37. The computer-readable medium of claim 36 wherein said distributed logging scheme includes maintaining parallel logfiles on at least some of said untrusted computers.

38. The computer-readable medium of claim 37 wherein said parallel logging includes the use of pad values in at least some of said logfiles.

39. The computer-readable medium of claim 36 wherein said distributed logging scheme includes secret sharing to store a logging parameter among at least some of said untrusted computers.

40. The computer-readable medium of claim 25 wherein said computer-readable medium is non-rewritable.

41. The computer-readable medium of claim 25 wherein said verification chain entry further comprises a value from a complementary audit log process.

42. The computer-readable medium of claim 25 wherein at least one of said elements (a), (b), (c), and (d) reflects the use of asymmetric cryptographic operations.

43. A method for verifying entries in an audit log, comprising the steps of:
(a) receiving an audit log including a plurality of log entries, each entry having:
 (i) a logged quantity; and
 (ii) a verification chain entry comprising a verifiable cryptographic representation of:
  (A) at least a portion of a preceding verification chain entry, and
  (B) said logged quantity;
 said cryptographic representation having been computed using an entry-specific cryptographic key that was derived by computing a cryptographic hash on at least a cryptographic key for said preceding entry; and
(b) verifying a sequence of said verification chain entries from their respective preceding verification chain entries.

44. The method of claim 43 where said step of verifying said sequence of said verification chain entries includes:
(a) extracting, from said audit log, initialization information including a starting cryptographic key; and
(b) starting from said extracted starting authentication key, computing an entry-specific cryptographic key for each of said audit log entries in said sequence by performing a cryptographic hash operation on at least a cryptographic key for a preceding audit log entry.

45. The method of claim 44 further comprising the step of verifying each of said verification chain entries using a corresponding one of said computed cryptographic keys.

46. A method for creating an audit log entry having enhanced security against tampering, comprising the steps of:
(a) receiving a datum to be logged;
(b) encrypting said datum with a first cryptographic key;
(c) concatenating a permission mask and a first verification chain entry with said encrypted datum;
(d) performing a first verifiable cryptographic operation on the result of step (c) to generate a second verification chain entry; and
(e) using a first authentication key, performing an authenticatable cryptographic operation on said second verification chain entry to form a cryptographically authenticatable representation thereof;
(f) writing, to a memory, an audit log entry including said encrypted datum, said permission mask, said second verification chain entry, and said cryptographically authenticatable representation of said second verification chain entry.

47. The method of claim 46 further comprising the step of generating a second authentication key usable for a subsequently generated audit log entry.

48. The method of claim 47 wherein said step of generating a second authentication key includes computing a cryptographic hash on said first authentication key.

49. The method of claim 46 further comprising the step of generating a second cryptographic key usable for a subsequently generated audit log entry.

50. The method of claim 49 wherein said step of generating said second cryptographic key includes computing a cryptographic hash on said permission mask and said first authentication key.

51. The method of claim 50 further comprising the step of deleting said first cryptographic key.

52. The method of claim 50 further comprising the step of deleting said first authentication key.

53. A computer-readable medium embodying a software program for creating an audit log entry having enhanced security against tampering, said software program comprising:
(a) program code configured to receive a datum to be logged;
(b) program code configured to encrypt said datum with a first cryptographic key;
(c) program code configured to concatenate a permission mask and a first verification chain entry with said encrypted datum;
(d) program code configured to perform a first verifiable cryptographic operation on the result of step (c) to generate a second verification chain entry; and
(e) program code configured to use a first authentication key to perform an authenticatable cryptographic operation on said second verification chain entry to form a cryptographically authenticatable representation thereof;
(f) program code configured to write, to a memory, an audit log entry including said encrypted data, said permission mask, said second verification chain entry, and said cryptographically authenticatable representation of said second verification chain entry.

54. The software program of claim 53 contained in an electronic wallet.

55. A computer-readable medium comprising a data structure for use as an audit log entry having enhanced security against tampering, said data structure including:

(a) a permission mask;
(b) an encrypted datum having been encrypted using a cryptographic key, said cryptographic key comprising a first cryptographic representation of:
  (i) said permission mask, and
  (ii) an authentication key;
(c) a verification chain entry comprising a second cryptographic representation of:
  (i) a preceding verification chain entry,
  (ii) said permission mask, and
  (iii) said encrypted datum; and
(d) a third cryptographic representation, of said verification chain entry, having been derived by performing an authenticatable cryptographic operation on said verification chain entry using said authentication key.

56. The computer-readable medium of claim 55 comprising an electronic wallet.

57. The data structure of claim 55, said first cryptographic representation having been derived using a cryptographic hash operation.

58. The data structure of claim 55, said second cryptographic representation having been derived using a cryptographic hash operation.

59. The data structure of claim 55, said authenticatable cryptographic operation being a MAC operation.

60. The data structure of claim 55, said authentication key having been derived by performing a cryptographic hash operation on a preceding authentication key.

61. A method for verifying entries in an audit log, comprising the steps of:
  (a) receiving an audit log including a plurality of log entries, each entry having:
    (i) a permission mask,
    (ii) an encrypted datum having been encrypted using a cryptographic key, said cryptographic key being a first cryptographic representation of:
      (A) said permission mask, and
      (B) an authentication key specific to said entry,
    (iii) a verification chain entry that is a second cryptographic representation of:
      (A) a preceding verification chain entry,
      (B) said permission mask, and
      (C) said encrypted datum; and
    (iv) a cryptographically authenticatable representation of said verification chain entry, derived by performing an authenticatable cryptographic operation on said verification chain entry using said authentication key; and
  (b) verifying a sequence of said verification chain entries from their respective preceding verification chain entries.

62. The method of claim 61 further comprising the steps of:
  (a) extracting, from said audit log:
    (i) initialization information including a starting authentication key and a starting cryptographic key, and
    (ii) a permission mask entry for each of said audit log entries; and
  (b) starting from said extracted starting authentication key, computing an authentication key, for each of said audit log entries, by performing a first cryptographic operation on an authentication key for a preceding audit log entry.

63. The method of claim 62 wherein said first cryptographic operation is a hash operation.

64. The method of claim 62 further comprising the step of verifying a last of said verification chain entries by recomputing said third cryptographic representation of said last verification chain entry, using said authentication key for said last of said audit log entries.

65. The method of claim 62 further comprising the step of verifying each of said verification chain entries using a corresponding one of said computed authentication keys.

66. The method of claim 62 further comprising the step of computing a cryptographic key for each of said audit log entries, by performing a second cryptographic operation on corresponding ones of said permission masks and said computed authentication keys.

67. The method of claim 66 wherein said second cryptographic operation is a hash operation.

68. The method of claim 66 further comprising the step of decrypting at least some of said encrypted data using corresponding ones of said computed cryptographic keys.

69. The method of claim 61 further comprising the steps of:
  (a) identifying a subset of said audit log entries to which access is desired;
  (b) sending a request, including corresponding ones of said permission masks for said audit log entries of said subset, to a trusted computer that participated in creation of said audit log; and
  (c) receiving from said trusted computer a response to said request, said response including a cryptographic key for each of said audit log entries in said request, each said cryptographic key having been computed from said permission masks in said request.

70. The method of claim 69 further comprising the step of using said received cryptographic keys to decrypt said audit log entries of said subset.

\* \* \* \* \*